(12) United States Patent
Bekiares et al.

(10) Patent No.: US 10,880,108 B2
(45) Date of Patent: Dec. 29, 2020

(54) OPTIMIZED WIRELESS CONTENT LOADING SCHEDULER

(71) Applicant: GOGO BUSINESS AVIATION LLC, Broomfield, CO (US)

(72) Inventors: Tyrone D. Bekiares, Park Ridge, IL (US); Brian R. Smith, Chicago, IL (US); Sajit Sasi, Burr Ridge, IL (US); William A. Kelleher, Chicago, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 122 days.

(21) Appl. No.: 15/622,409

(22) Filed: Jun. 14, 2017

(65) Prior Publication Data

US 2018/0367324 A1    Dec. 20, 2018

(51) Int. Cl.
| | | |
|---|---|---|
| H04L 12/18 | (2006.01) | |
| H04L 29/08 | (2006.01) | |
| H04B 7/185 | (2006.01) | |
| H04L 29/06 | (2006.01) | |

(52) U.S. Cl.
CPC ......... *H04L 12/18* (2013.01); *H04B 7/18508* (2013.01); *H04B 7/18513* (2013.01); *H04L 65/4076* (2013.01); *H04L 67/12* (2013.01); *H04L 67/325* (2013.01)

(58) Field of Classification Search
None
See application file for complete search history.

(56) References Cited

U.S. PATENT DOCUMENTS

| | | | | |
|---|---|---|---|---|
| 6,138,144 A | * | 10/2000 | DeSimone | H04L 12/18 709/204 |
| 6,810,527 B1 | * | 10/2004 | Conrad | H04N 7/163 348/E7.061 |
| 10,475,346 B1 | * | 11/2019 | Sheth | G06Q 10/047 |
| 2003/0087638 A1 | * | 5/2003 | Taylor | H04W 4/00 455/445 |

(Continued)

OTHER PUBLICATIONS

Fung, Brian, "At last! The FAA has seen the light on in-flight electronics", Oct. 31, 2013, The Washington Post (Year: 2013).*

(Continued)

*Primary Examiner* — Noel R Beharry
*Assistant Examiner* — Rodrick Mak
(74) *Attorney, Agent, or Firm* — Marshall Gerstein & Borun LLP; Randall G. Reuth

(57) ABSTRACT

Systems and methods for multicasting a dataset to a fleet of vehicles by a deadline based on respective transit schedules of vehicles in the fleet are disclosed. Based on the vehicle transit schedules, a time segment may be determined for delivering at least a portion of the dataset to at least a subset of the vehicles in the fleet. The determination may be based on a maximum number of fleet vehicles that are scheduled to be simultaneously in transit. The determination may be additionally or alternatively based on an available transmission bandwidth, a time segment duration, a minimum transit duration, and/or other criteria. A multicast transmission including at least a portion of the data set is initiated based on the determination. Multiple multicasts and unicasts may achieve the complete transmission of the entire dataset to the entire fleet of vehicles prior to a deadline.

20 Claims, 8 Drawing Sheets

(56) References Cited

U.S. PATENT DOCUMENTS

| | | | | |
|---|---|---|---|---|
| 2009/0070841 | A1* | 3/2009 | Buga | H04L 67/12 |
| | | | | 725/116 |
| 2010/0142482 | A1* | 6/2010 | Lu | H04B 7/18506 |
| | | | | 370/331 |
| 2015/0017609 | A1* | 1/2015 | Leao | G09B 9/08 |
| | | | | 434/30 |
| 2015/0308834 | A1* | 10/2015 | Demortier | G05D 1/0676 |
| | | | | 701/18 |
| 2016/0104383 | A1* | 4/2016 | Chandran | G08G 5/0043 |
| | | | | 701/120 |
| 2016/0105775 | A1* | 4/2016 | Azmat | H04W 4/08 |
| | | | | 455/518 |
| 2018/0007518 | A1* | 1/2018 | O'Berry | H04B 7/15507 |
| 2018/0176750 | A1* | 6/2018 | Xu | H04L 29/08 |
| 2019/0052700 | A1* | 2/2019 | Basra | H04L 67/10 |

OTHER PUBLICATIONS

International Search Report and Written Opinion, corresponding International Application No. PCT/US2018/036072, dated Sep. 3, 2018.

Werner et al., "Aeronautical Broadband Communications Via Satellite," (XP055502215) (2001). Retrieved from the Internet on Aug. 24, 2018: URL:http://www.mp.hawhamburg.de/pers/Scholz/dglr/bericht0101/Werner.pdf.

* cited by examiner

OPTIMIZED WIRELESS CONTENT LOADING SCHEDULER

FIELD OF THE INVENTION

The following disclosure generally relates to multicasting a dataset to a fleet of vehicles. More particularly, the following disclosure generally relates to scheduling multicast transmissions based on the respective transit schedules of vehicles in the fleet, and initiating multicast transmissions to subsets of vehicles that are scheduled to be simultaneously in transit.

BACKGROUND

Modern airborne environments offer passengers a catalog of media content to be consumed during all stages of flight, either via passenger-owned electronic devices ("PEDs") or via seatback monitor systems. Because of the high cost and/or low throughput associated with wireless transmission to aircraft in-flight (e.g., via satellite or via ground-to-air networks), it is not practical to stream media content directly from ground networks to in-flight aircraft in an on-demand fashion. Rather, such media content needs to be stored or cached on an airborne storage platform.

Traditional means of updating such airborne storage platforms may include the use of USB "sticks" and removable hard drives, typically, while an aircraft is parked at the gate or otherwise on the ground. Such mechanisms, while offering large capacities, are logistically complicated to deploy en mass, largely due to the physical nature of the medium. These logistical complications may cause long delays between when new media content is available on the ground, and when new media content is available on the airborne storage platform.

Various wireless means to upload new media content to airborne storage platforms have been proposed. These means include, for example, satellite transmission. Satellite transmission is an attractive option for delivering a same content to a fleet of planes, at least some of which may be airborne, due to the availability of a multicast transmission service. A single occupation of satellite bandwidth can provide the same content to a number of planes N, regardless of the magnitude of N.

Multicast file transmission is relatively straightforward when each recipient is consistently capable of reception. In the airline industry, however, aircraft (also referred to as "tails") are generally only guaranteed to be capable of reception during an Above Service Altitude (ASA) phase (e.g., above 10,000 feet) of flight. The ASA boundary (e.g. 10,000 feet) may be determined by a jurisdictional or governmental body, or by some other criteria.

If a file is sent via a multicast transmission at an arbitrary time, some or all of the targeted tails may not necessarily be ASA. Further, those tails that are ASA may land before the file transmission is complete, and thus not be ASA for the entirety of the transmission. Conventionally, this may be dealt with by simply repeating the multicast transmission multiple times, in hopes that all targeted tails may ultimately receive all segments of the intended file. This "brute force" approach, however, can be costly given the cost of satellite bandwidth. Further, selection of a bit rate at which to transmit the content also has appreciable business case implications. A bit rate that is too high may steal bandwidth from In-Flight Connectivity ("IFC") services, impacting IFC availability. A bit rate that is too low may prevent targeted tails from receiving the entire intended file during respective spans of flight, thus prompting costly duplicative retransmission of data.

SUMMARY

This summary is provided to introduce a selection of concepts in a simplified form, with the concepts further described in the detailed description. This summary is not intended to identify key features or essential features of the claimed subject matter, nor is it intended to be used to limit the scope of the claimed subject matter.

The present invention takes advantage of the advance availability of vehicle transit schedules, allowing for the intelligent scheduling of multicast and unicast satellite transmissions to a set of vehicles in a "fleet." Multicasting according to intelligent scheduling methods allows for more efficient use of transmission bandwidth than used by traditional transmission methods.

In one embodiment, a method of optimizing delivery of a dataset to a fleet of vehicles may be provided. The method may include (1) determining, based on respective transit schedules of vehicles included in the fleet, a time segment, within a time interval, for delivering at least a portion of the dataset to at least a subset of the vehicles included in the fleet, wherein the number of fleet vehicles in the at least the subset of fleet vehicles is a maximum number of fleet vehicles that are scheduled to be simultaneously in transit during the time interval, and/or (2) initiating a multicast transmission of the at least the portion of the dataset to the at least the subset of vehicles at a start time of the time segment.

In another embodiment, a method of optimizing delivery of a dataset to a fleet of vehicles may be provided. The method may include (1) based on respective transit schedules of vehicles included in the fleet, generating a transmission schedule for delivering the dataset to the fleet of vehicles over a time interval, the transmission schedule defining a plurality of time segments during which respective portions of the dataset are to be multicasted to respective subsets of the vehicles included in the fleet, the plurality of time segments being mutually exclusive time segments within the time interval, and a particular time segment in the plurality of time segments being a portion of the time interval during which a maximum number of vehicles included in the fleet are scheduled to be simultaneously in transit, and/or (2) initiating multicast transmission of the dataset to the fleet of vehicles in accordance with the transmission schedule.

In yet another embodiment, a system for optimizing delivery of a dataset to a fleet of vehicles may be provided. The system may include (1) an input to obtain respective transit schedules of vehicles included in the fleet, (2) a transmission scheduler comprising computer-executable instructions that are stored on one or more memories and that, when executed by one or more processors, cause the system to (i) determine, based on the respective transit schedules of the vehicles included in the fleet, a time segment within the time interval, during which a maximum number of fleet vehicles are scheduled to be simultaneously in transit, (ii) based on the determined time segment, determine a portion of the dataset, and (iii) generate a transmission schedule for the dataset over the time interval, the transmission schedule defining an associated between the determined time segment, the determined portion of the dataset, and a subset of the vehicles included in the fleet and corresponding to the maximum number of fleet vehicles that are scheduled to be simultaneously in transit during the time segment, and/or (3) a transmission subsystem that initiates, based on the generated transmission schedule, multicast transmission of the portion of the dataset during the time segment of the time interval to the subset of the vehicles included in the fleet.

DETAILED DESCRIPTION

Figure 1:
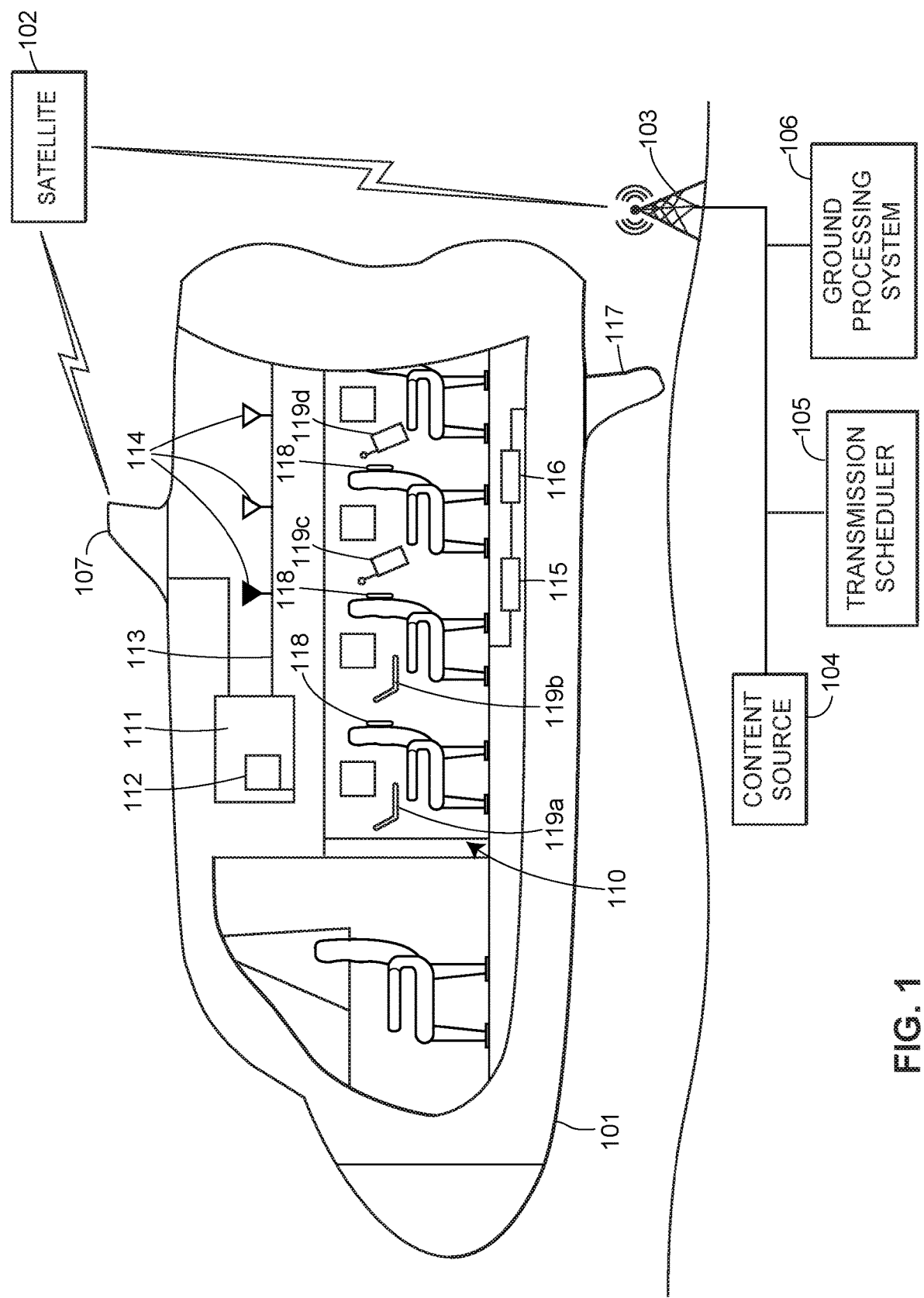
FIG. 1 illustrates an example system including a particular aircraft capable of receiving a satellite or broadband multicast transmission of a dataset.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Conventionally, multicast file transmission is an attractive option for transmitting a file or dataset X from a origin M to two or more targets N (in other words, a "one-to-many" file distribution). Multicast file transmission is a particularly attractive solution in satellite transmission, as a single occupation of the often-limited satellite bandwidth may successfully transmit the file X to each target N.

Multicast transmissions, of course, generally rely on the availability of each target N to receive a transmission. A target N may, for example, be unavailable if the target N is physically located in a region lacking connectivity, or if N is otherwise offline. This problem may not be readily apparent in conventional computing environments, wherein targets may be statically located and/or consistently connected to a wired or wireless network. However, this problem is particularly visible when the targets are a fleet of vehicles, such as aircraft. Vehicles, particularly aircraft, may be subject to rapid and frequent changes in location (and therefore rapid and frequent changes in their ability to receive transmissions of sufficient fidelity), and further, may be subject to jurisdictional regulations regarding when the vehicle may receive a transmission. In some circumstances, a vehicle may even be incapable more often than it is capable of receiving a multicast transmission.

There is, however, an advantage that is particular to commercial vehicles. Commercial vehicles, such as aircraft used in the airline industry, generally follow a predefined transit schedule, and any unforeseen changes in transit may be quickly and accurately reflected in the schedule. As a result, a vehicle transit schedule may be used to determine a priori where one or more vehicles, such as aircraft, will be located at any given time, and thus the ability of the one or more vehicles to receive satellite transmissions may also be predetermined to a significant extent.

In general, aircraft follow a reasonably well-defined flight schedule, barring delays such as those due to air traffic and weather. Even when such delays occur, intelligent scheduling of multicast transmissions may produce a superior "hit rate" (e.g., aircraft that successfully receive a large portion or an entirety of a dataset via a single multicast transmission) compared to arbitrary scheduling of multicast transmissions.

At a high level, the present disclosure is predicated on the idea of a priori scheduling of multicast file transmission based on known flight schedules of target aircraft in a fleet of aircraft. Scheduling of a particular multicast file transmission may include selection at least a subset of aircraft in the fleet to receive the transmission, selection of a time segment for transmission, and selection of data transmission rate at which to transmit a portion of, or the entirety of, a dataset. Selection of the above transmission criteria (or any other transmission criteria described herein) may include prioritization or weighting of one or more transmission criteria over another one or more transmission criteria, and/or may include determination of a "tradeoff" between one or more prioritized or weighted transmission criteria and another one or more transmission criteria, as will be described further herein.

Accordingly, the present invention improves an existing technological process in the field of satellite data distribution to vehicles. For example, the present invention utilizes vehicle transit schedules to determine a multicast satellite transmission schedule such that a fleet of recipient vehicles may more efficiently receive a dataset, as well as other improvements.

In the embodiments described herein, the recipient vehicles of the scheduled multicast transmissions generally are aircraft. However, these embodiments are not intended to limit the scope of this patent. The described systems and methods may be applied to deliver datasets to other vehicles such as trains, ships, busses and automobiles (e.g., delivery trucks), or different combinations of vehicles, where capability of the vehicles to receive multicast satellite transmissions depends on a transit schedule.

In the embodiments described herein, a "dataset" may generally be described as media content (e.g., movies, television shows, shopping catalogs, etc.) that may be consumed by passengers aboard an aircraft. However, these embodiments are not intended to limit the scope of this patent. The datasets transmitted using the systems and methods herein may alternatively include weather reports, software and firmware updates, flight data, or any other data that may be desired to be received onto one or more vehicles.

A dataset that is to be transmitted to a fleet of vehicles may be forwarded to a ground processing system, which may break the dataset into smaller portions for transmission. Portioning of the dataset may be useful if, for example, at least one aircraft or tail is scheduled to receive the dataset on a piece-by-piece basis. As another example, portioning may be useful if one or more tails are scheduled to receive only most of a dataset, or if one or more tails unexpectedly fail to receive a scheduled multicast transmission. Overall, transmission of portions of the dataset may allow for "surgical" delivery and redelivery of data without requiring a potentially costly retransmission of the entire dataset.

An operating user, a stored file, and/or other electronic data may indicate a fleet of aircraft that is targeted for delivery of the dataset, and/or a deadline by which all transmission of the entire dataset must be completed and the dataset be present and available on each aircraft of the target fleet of aircraft. At some time prior to the dataset delivery deadline (e.g., 48 hours or some other suitable length of time, which may be configured), flight schedules for each aircraft of the fleet of aircraft may be retrieved from a flight schedule service provider. The flight schedules may indicate or allow a transmission scheduler to determine during which time periods or intervals each aircraft of the fleet of aircraft is scheduled be in transit and/or ASA. For example, the transmission scheduler may run an algorithm to determine one or more optimal transmission start times which maximize the number of aircraft in a subset of fleet aircraft that are scheduled to be ASA simultaneously. The determination of the one or more transmission start times may also include determination of the one or more tails to receive each transmission, as well as determination of the one or more portions of data from the dataset that is to be transmitted in each transmission.

An algorithm for scheduling one or more multicast transmissions (and data) for transmission may include the determination, prioritization, and/or weighting of one or more transmission maximization or optimization criteria. The one or more transmission maximization/optimization criteria for multicast transmission scheduling may include, for example:

maximizing a number of tails in transit and/or ASA, maximizing a size of a segment of a dataset that is transmitted in a single transmission, maximizing durations of transmission windows (in other words, maximize a duration of a time segment for transmission), utilizing transmission windows of at least a minimum duration (in other words, a minimum duration of a time segment for transmission), utilizing a maximum, minimum, and/or pre-defined transmission bit rate, utilizing a maximum, minimum, and/or pre-defined transmission bandwidth (in other words, the bandwidth available to one or more tails), utilizing an expected and/or observed in-transit connectivity usage (i.e., reflecting an amount of the transmission bandwidth in use by passengers, for example), utilizing expected and/or observed in-transit connectivity cost, and/or any other desired criteria.

In some embodiments, more than one maximization criteria may be considered by the scheduling algorithm. In some embodiments, some maximization criteria may be assigned a "weight" or preference with respect to other maximization criteria. For example, if maximizing the duration of transmission windows is desired, the transmission scheduler may give preference to a longer possible transmission time segment, compared to a shorter transmission time segment. In some embodiments, a maximization criterion may be a hard limit—in other words, the transmission scheduler may, for example, always schedule the longest duration of a transmission window available at any given time, regardless of other criteria that may favor other possible durations of transmission time windows.

In an embodiment, the algorithm may seek to maximize the duration of transmission time windows. In other words, the algorithm may choose a transmission start time after which each of the subset of aircraft are scheduled to be continuously and simultaneously ASA for a particular duration of time, which may be a parameter that is modifiable by an operator of the transmission scheduler.

In an embodiment, a maximum data transmission rate may be fixed. For example, a portion of a dataset may be transmitted at a maximum rate of 1 Mb/s. As such, in this embodiment, the minimum duration of time required to fully transmit a given dataset or portion of a dataset may also be fixed. As such, the algorithm may select a start time which maximizes the number of aircraft in the simultaneously ASA subset of aircraft for at least the required transmission duration.

In another embodiment, the data transmission rate may not be fixed. In this embodiment, the algorithm may first maximize the number of simultaneously ASA aircraft in the subset, as well as maximize the duration that the subset of aircraft are scheduled to be continuously and simultaneously ASA. The transmission scheduler may derive the data transmission rate based upon the duration of time during which the subset of aircraft are scheduled to be simultaneously ASA.

In any case, it should be understood that prioritization or weighting of any one or more transmission maximization criteria may effectively result in a "tradeoff" at the expense of another one or more transmission maximization criteria. For example, prioritization of sending a large segment of a dataset in a single transmission may necessitate a higher data transmission rate for the transmission, or may reduce the number of tails capable of receiving the transmission. Prioritization or weighting of one or more transmission maximization criteria may include consideration of one or more tradeoffs that may be inherent to or may otherwise result from the prioritization or weighting.

In some embodiments, the algorithm may also take into account previous IFC traffic patterns (e.g., times at which IFC bandwidth usage is typically at its lowest), as well as any dynamic IFC costs (e.g., when a satellite provider's bandwidth cost changes with time of day). If multiple possible transmission time windows are similar with respect to other characteristics (e.g. number of simultaneously ASA aircraft and duration of simultaneously ASA time), it may be preferable to select the transmission time window with lower cost or lower impact to IFC. Those windows of lower cost or impact may be "weighted" accordingly in the scheduling algorithm, and may further be utilized to mitigate negative effects of a tradeoff caused by prioritization or weighting of a particular one or more transmission maximization criteria. For example, a window of low IFC usage may be particularly useful in circumstances wherein a need to transmit a large magnitude of data in a short period of time necessitates a high data transmission rate.

The transmission scheduler may run the algorithm iteratively to determine multiple optimal transmission time windows for delivering multiple portions of the data set, which collectively cover the transmission of the entire dataset to a majority of the targeted aircraft. Subsequent transmission time windows may be selected to target aircraft which were known not to be in subsets of aircraft receiving previous multicast transmissions. If necessary, the transmission scheduler may schedule unicast satellite transmissions to complete the transmission schedule. Upon completion of the transmission schedule, the dataset may be transmitted according to the transmission schedule.

In the embodiments described herein, two or more time segments during a time interval for transmission of the dataset (e.g., a plurality of time segments making up a multicast/unicast transmission schedule) may be mutually exclusive time segments. In other words, if a transmission schedule includes ten scheduled transmissions, for example, each respective time segment for a respective transmission may not overlap with any of the other nine time segments. In effect, when time segments are mutually exclusive, no more than one transmission may be carried out at any time. It may be necessary for time segments to be mutually exclusive if, for example, the transmission scheduler can only schedule a single occupation of satellite bandwidth at any given time.

However, in some embodiments, a plurality of time segments may not be mutually exclusive. In effect, in these embodiments, the transmission scheduler may schedule two discrete occupations of satellite bandwidth (and thus, two different multicast or unicast transmissions) to occur at a given time.

In this detailed description, multicast and unicast transmissions are generally described as multicast satellite transmissions and unicast satellite transmissions. Satellite transmissions may include satellite transmissions of frequencies in the L, S, C, X, Ku, K, Ka, and/or any other suitable bands. However, the concepts described in this detailed description may apply equally to any suitable broadband transmissions, e.g., other types of air-to-air transmissions, air-to-ground (ATG) or other transmissions in the 2.4 GHz, 3.65 GHz, 4.9 GHz, 5 GHz, and/or 5.9 GHz bands) in which one or more antennas may be disposed elsewhere on an aircraft (e.g., on one or more wings and/or a belly of the aircraft), etc.

FIG. 1 illustrates an example system including an aircraft (hereinafter referred to as a "tail") 101 capable of receiving a satellite transmission of a dataset or a portion of a dataset. For ease of reading herein (and not for limitation purposes), a unit or grouping of data that is at least a portion of, or the entirety, of a dataset is referred to hereinafter as "data."

A transmission scheduler 105 may schedule transmissions to the tail 101 such that the tail 101 receives the entirety of the dataset during a time interval preceding a given deadline (e.g., 48 hours prior to the given deadline, or some other suitable time interval). The transmission scheduler 105 may receive a flight or transit schedule reflecting the tail's flight schedule for a time interval immediately preceding the deadline. The transmission scheduler 105 may receive the flight schedule via one or more wired and/or wireless connections using one or more known communication protocols, for example. In any case, the transmission scheduler 105 may determine, based on the transit schedule of the tail 101, a time segment within the preceding time interval for delivering the dataset or a portion of the dataset to the tail 101 during which the tail 101 is scheduled or expected to be ASA.

The dataset may originate from a content source 104, which may be any source from which the dataset may be identified and retrieved (e.g., a ground server, a local memory, the Internet, etc.). Optionally, if the transmission scheduler 105 determines that only a segment or a portion of the dataset is able to be transmitted to the tail 101 during a particular transmission, a ground processing system 106 may segment the dataset into two or more data portions, and prepare respective data portions for transmission during separate time segments and/or transmission bit rates, which may be determined by the transmission scheduler 105. Different data portions may be entirely incongruous or partially incongruous. In other words, two or more data portions may or may not have a shared overlap. A ground transmitter 103 may transmit the dataset or each portion of data to a satellite 102 either before or at its scheduled data transmission time, such that the satellite 102 is able to receive or accumulate the data to prepare for the transmission. The satellite 102 may transmit (e.g., multicast and/or unicast) the datasets or portions of data as provided by the ground transmitter. For example, if the satellite 102 receives a portion of the dataset, a satellite transmission may be a multicast or unicast transmission of only the portion of the dataset.

In some embodiments, segmentation of a dataset into two or more portions may be based on media content length or time duration. For example, a timewise segmentation of a video file may segment the file into two or more data portions wherein each data portion includes a part of the full video file (e.g., a first minute portion, a second minute portion, etc.).

However, other segmentation methods are possible, in some embodiments. Returning to the above example of a video file, another possible segmentation method may utilize scalable video coding (SVC), whereby a first one or more data portions may include the video file (or a part thereof) in the form of a subset bitstream representing a lower video quality level (e.g., spatial resolution, frame rate, etc.), and whereby one or more subsequent data portions may include an enhancement layer that serves to augment the first data portion to achieve the video quality level of the complete video file. In effect, reception of the first data portion at a tail, in these embodiments, may allow passengers aboard the tail to view video content (albeit at a lower quality level) before the enhancement layer is received at the tail. Similar techniques may be used to other (non-video) datasets. For example, another dataset may be segmented into a first one or more compressed data portions and a subsequent one or more uncompressed data portions, in some embodiments.

It is to be noted that, although in FIG. 1 the content source 104, transmission scheduler 105, and ground processing system 106 are depicted as separate entities, in some embodiments, two or more of the content source 104, transmission scheduler 106 and/or ground processing system 106 may be an integral entity.

In accordance with the determinations made by the transmission scheduler 105, the satellite 102 transmits the data to the tail 101. For a particular transmission, the tail 101 may be just one of multiple tails receiving a same multicast satellite transmission. Alternatively, the tail 101 may be the sole recipient of a unicast satellite transmission. In any case, the tail 101 may receive the satellite transmission via a satellite antenna 107. In response, the tail 101 may return an acknowledgment that the data has been fully received (e.g., if a transmission is scheduled to transmit only a portion of the dataset, the tail 101 may return an acknowledgement indicating that the tail has fully received and/or has stored the portion of the dataset. In effect, the tail 101 may return an acknowledgement after each of one or more instances of receiving at least a portion of the dataset. Because the data may delivered prior to a time at which the data is needed or required on-board the tail 101, it may be necessary for the tail 101 to store the data, for example, at a content store 112.

The tail may return an acknowledgement via the satellite 102 to the ground, indicating that the data has been successfully received. Alternatively, the tail 101 may send the acknowledgment directly to the ground via an Air-To-Ground Airborne Communications Unit (AACU) 115, a transceiver 116, and an air-to-ground antenna 117, if a direct connection to the ground is possible. In any case, in this embodiment, the transmission scheduler 105 may receive acknowledgement that the tail 101 has indeed received the data in accordance with the generated schedule. If a transmission scheduler 105 does not receive an expected acknowledgment of receipt from the tail 101, the transmission scheduler 105 may adjust the schedule such that the data may be retransmitted to the tail 101. The retransmission may be a unicast to the single tail or a multicast to more than one tail (e.g., the failed tail may be added to a list of recipients of a previously scheduled transmission).

In one possible embodiment, the data transmitted to the tail 101 may be media content. When the media content is successfully received at the satellite antenna 107 and stored aboard the tail (for example at a content store 112), the media content may be acquired by passengers aboard the tail 101 during flight. A passenger may receive the content, for example, via a seatback monitor system 118. Alternatively, a passenger may use a Personal Electronic Device (PED) (e.g. one or more of the PEDs 119a-119d) to establish a wireless connection to an in-flight Local Area Network 110. The wireless communications of the Local Area Network 110 may be controlled by an Airborne Control Processor Unit (ACPU) 111 and augmented by a transceiver 113 and wireless access points 114 aboard the tail. Once connected, a PED 119 may access media content offerings available at the content store.

Figure 2:
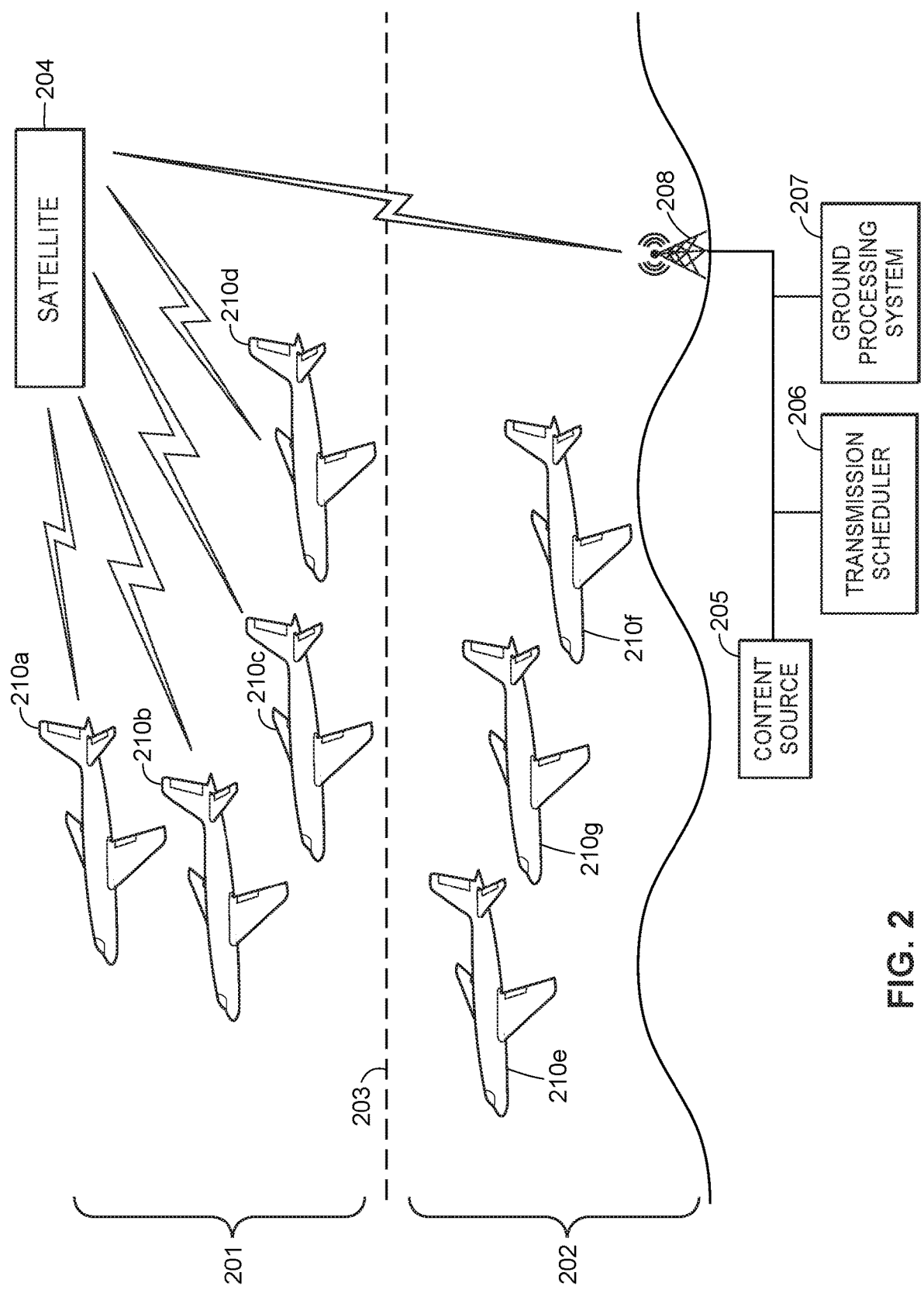
FIG. 2 illustrates an example system including a plurality of aircraft at various points in transit, in which a subset of the plurality of aircraft are capable of receiving a multicast transmission of a dataset.

FIG. 2 depicts an example system including a fleet of tails at various points in transit. Each of the tails 210a-210g may be a tail similar to the tail 101 shown in FIG. 1 and described above. A satellite 204 may be the satellite 102 shown in FIG. 1 and described above. Further, the ground transmitter 208, content source 205, transmission scheduler 206, and ground processing system 207 may be the respective elements 103, 104, 105, and 106 depicted in FIG. 1.

At any given time, each tail's capability of receiving a multicast or unicast satellite transmission may be dependent on the tail's altitude with respect to an Above Service Altitude (ASA) threshold (e.g. 10,000 feet). This threshold is illustrated in FIG. 2 as the ASA boundary 203. Tails above the ASA boundary 203 may be referred to as being ASA, and thus the tail may be capable of receiving a satellite transmission. A tail below the ASA boundary 203 may not be guaranteed to be capable of receiving the same transmission. In FIG. 2, tails 210a-210d are each above the ASA threshold 203, and tails 210e-210g are each below the ASA threshold 203. One or more of tails 210e-210g may be airborne but not ASA, which may indicate that the one or more tails are in a takeoff or landing phase of flight. Alternatively, one of tails 210e-210g may be at ground level, which may indicate that the tail is in a boarding, taxiing or parked phase. In any case, because tails 210e-210g are not ASA, those tails may not be guaranteed or even expected to be able to receive a satellite transmission.

A transmission scheduler 206 may schedule multicast and unicast transmissions such that each of the tails included in the fleet is able to receive the entirety of the dataset in a time interval before a given deadline (e.g., 48 hours ahead of the deadline or other suitable preceding interval) in the absence of error conditions such as re-routing, equipment failure, etc. The transmission scheduler 206, based the respective transit schedules of each tail included in the fleet, may, for example determine that the arrangement of tails at a given time before the deadline may be akin to the arrangement depicted in FIG. 2. In other words, the transmission scheduler 206 may determine that, during a given time interval, tails 210a-210d may be capable of receiving a satellite transmission, while tails 210e-210g may not be capable of receiving the same transmission. The transmission scheduler 206 may determine that the four tails 210a-210d are the maximum number of fleet vehicles that are scheduled to be simultaneously ASA during the time interval before the deadline.

Thus, the transmission scheduler 206 may schedule a multicast transmission to a fleet subset 210a-210d. The duration of this multicast transmission may not exceed the length of time that each of the tails 210a-210d remains simultaneously ASA. In other words, the maximum duration of a time segment for a multicast transmission (also referred to as a "transmission time window") to the subset of tails 210a-201d may be equal to the length of time that all of tails 210a-210d are scheduled to remain simultaneously ASA. Thus, if tail 210d, for example, were scheduled to fall below the ASA boundary 203 at a time, for example, ten minutes after the initiation of the multicast transmission, the time segment for that multicast transmission may be limited to a maximum ten minutes in length.

During transit of tails in the fleet, based on the schedule generated by the transmission scheduler, one or more multicast/unicast satellite transmissions are initiated. Each transmission may employ similar systems and techniques to those described above regarding FIG. 1 and FIG. 2, and each tail may employ similar systems and techniques for receiving, acknowledging receipt of, storing, and distributing data. The data may originate from a content source 205, which may be a local memory or server, the Internet, and/or any other suitable source from which the data may be identified and retrieved. If a particular transmission involves sending only a portion of the dataset, a ground processing system 207 may break the data into segments (e.g., 2 minutes of a 10 minute video file). The data may be accumulated at a satellite 204 via a ground transmitter 208, and the satellite 204 may distribute the dataset or portions of the dataset according to the multicast or unicast transmission scheduled by a transmission scheduler 206.

Each of the tails 210a-210g may be similar to the tail depicted in FIG. 1, comprising similar components to those described therein. Alternatively, the recipients of the multicast and unicast satellite transmissions described herein may instead be another type of vehicle, such as a train, boat, or automobile. Further, a fleet of vehicles could be made up of combinations of aircraft, trains, boats, automobiles, or other vehicles. While it is true that vehicles such as trains, boats, and automobiles may not face identical transmission limitations as aircraft (e.g. altitude with respect to an ASA of 10,000 feet), it is also true that vehicles such as trains, boats, and automobiles may face their own respective limitations with regard to when the vehicles are capable of receiving satellite transmissions. In these cases, the "ASA threshold" may then correspond with whatever particular limitation affects the times during which a particular vehicle or class of vehicle may receive satellite transmissions. Thus, the scheduling and transmission methods and systems described herein may feasibly be applied to vehicles other than aircraft.

Figure 3:
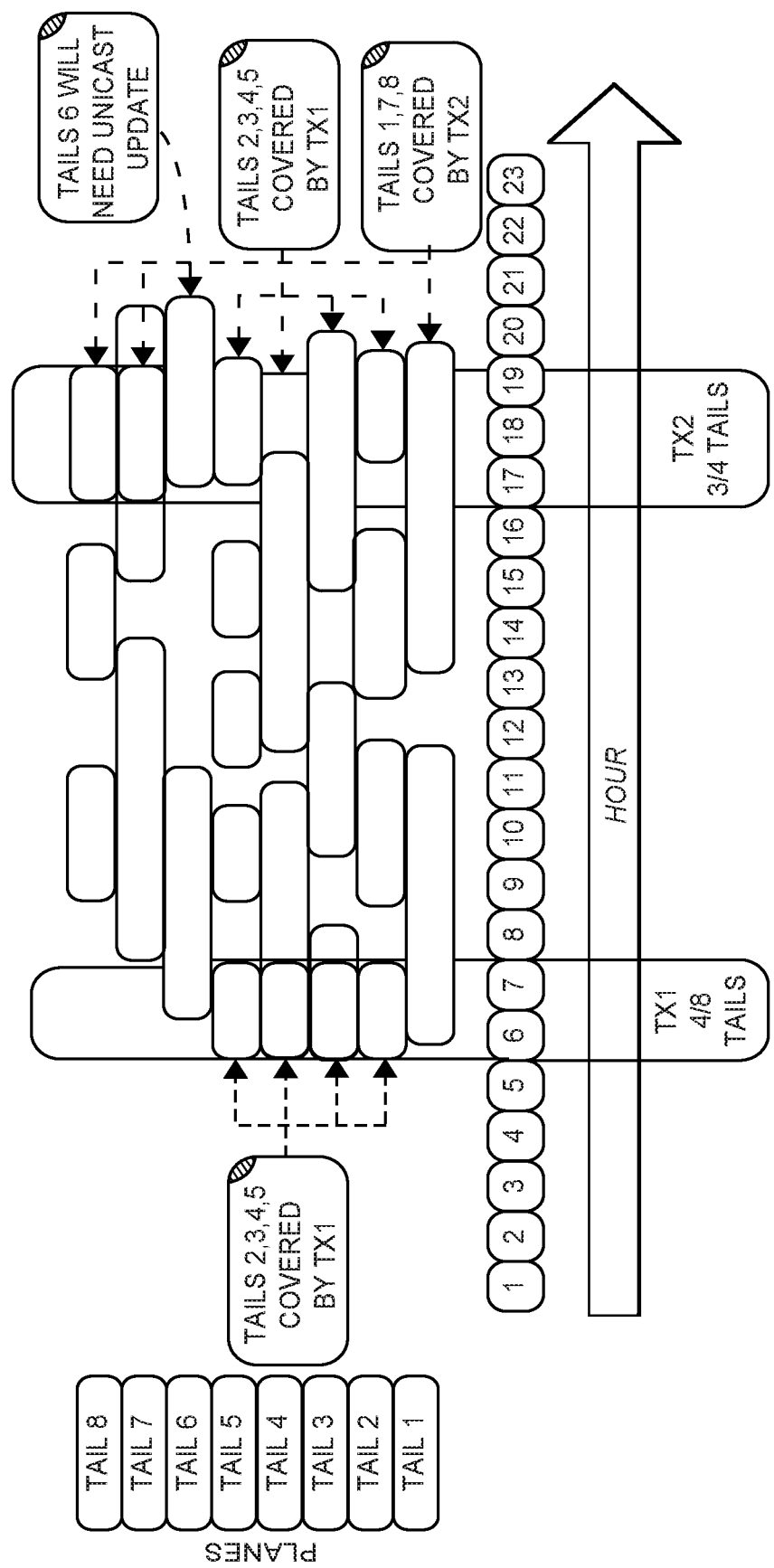
FIG. 3 illustrates an example scenario in which a first subset of aircraft in a fleet are determined to be capable of receiving a first multicast transmission, and a second subset of aircraft in the fleet are determined to be capable of receiving a second multicast transmission.

FIG. 3 is an example visual representation determined time segments for multicast and unicast transmissions based on scheduled or expected ASA times of Tails 1-9 included in an example fleet. The scheduled ASA times may be included in (or determined from) flight schedules received by a transmission scheduler, such as the transmission scheduler 206 of FIG. 2, for example.

For ease of description, FIG. 3 presents an embodiment with minimal transmission limitations or constraints. In this embodiment, it is a requirement that the entirety of the dataset be transmitted during a given time segment. In other words, in scheduling multicast transmissions, this embodiment generally does not employ the data portioning techniques described herein. However, it is especially noted that, in other possible embodiments, it may not be required that any one time segment transmit the entirety of the dataset.

The HOUR axis shown in FIG. 3 represents an exemplary time interval (a 24-hour interval denoted by hours 0-23) for transmission of a dataset to the fleet. Hour 0 may represent the earliest possible time for transmission, and the end of hour 23 may represent the deadline for arrival of the entire dataset to all tails in the fleet. The transmission scheduler may determine one or more time segments for multicast/unicast satellite transmissions during the time interval of hours 0-23 such that every tail receives the dataset prior to the conclusion of hour 23.

As shown in FIG. 3, a PLANES axis lists the Tails 1-8 of the fleet. The blocked segments in the field of the graph may signify the expected times during which Tails 1-8 are scheduled to be ASA, and therefore capable of receiving satellite transmissions, during the 24-hour time interval preceding the transmission completion deadline. For example, the enclosed segments in the row of Tail 1 may signify that Tail 1 is scheduled to be ASA during a period of time from hour 6 through part of hour 13, and during a second period of time from hour 14 through part of hour 21. Other respective rows represent the scheduled ASA times of the other respective tails during the time interval preceding the transmission completion deadline.

The transmission scheduler may determine, based on the respective schedules, an optimal time segment to transmit the dataset to at least a subset of the Tails 1-8, e.g., based on the one or more transmission maximization criteria. In the particular embodiment shown in FIG. 3, the multicast scheduler prioritizes, as its most important transmission maximization criteria, a maximization of the number of tails that are scheduled to be simultaneously ASA to receive the entire dataset. However, in other embodiments, one or more other transmission maximization criteria may be additionally or alternatively considered for selection of time segments. For example, segments during which in-flight connectivity cost or usage is low may be considered as a next-priority maximization criteria for transmissions.

Still referring to FIG. 3, based on the respective transit schedules of Tails 1-8, the transmission scheduler determines that a maximum number of tails (four) to which the dataset is able to be delivered occurs during the time segment TX 1. As shown in FIG. 3, TX 1 starts at approximately the beginning of hour 6 and ends at approximately the beginning of hour 8. TX 1 covers 4 of 8 tails. This time segment TX 1 is marked in the rows for Tails 2, 3, 4, and 5 to signify the determination of the first, prioritized time segment. The transmission scheduler may update a record of transmissions to indicate the scheduling of TX 1, which indicates, for example, the times of the starting and ending of TX 1, the identities of the recipient tails, and the data to be transmitted. Notably, in this example scenario time segment TX 1 is long enough that it allows for the multicast transmission of the entire dataset to Tails 2, 3, 4, and 5. Thus, the transmission scheduler determines at least a second time segment such that the dataset may be delivered to remaining tails. Because Tails 2, 3, 4, and 5 have already received the dataset, the transmission scheduler does not need to account for those tails in scheduling the second time segment.

The transmission scheduler may perform a second iteration of scheduling, with regard to the remaining Tails 1, 6, 7, and 8 instead of the entire set Tails 1-8. As a result, the transmission scheduler may determine a second time segment TX 2, during which a maximum number of the remaining tails (three tails, i.e., Tails 1, 7, and 8) are expected to be ASA. Still referring to FIG. 3, it is indicated that TX 2 covers three of the four remaining tails, and the appropriate time segment is indicated in the row of each tail.

After the determination of the second time segment, further transmissions need only be scheduled for delivery to Tail 6. Obviously, arrangement of a multicast transmission may not be necessary for a satellite transmission to a single tail. As such, the transmission scheduler may determine that Tail 6 is to receive the dataset via a unicast transmission. It may not be required that this unicast transmission take place after the multicast transmissions at time segments TX 1 and TX 2. For example, based on the ASA times of Tail 6, it is apparent that a time between hours 8 and 11 may also be appropriate for the unicast transmission. Of course, determination of a time for a unicast transmission, as with multicast transmissions, may include consideration of additional transmission factors, parameters, and costs such as those discussed herein with regard to FIG. 5.

Based on the determined time segments shown in FIG. 3, multicast and unicast satellite transmissions may be initiated using, for example, the systems and methods discussed with regard to FIGS. 1 and 2. The transmission scheduler may modify the scheduled transmissions if expected conditions are not met. For example, a tail's flight schedule may change unexpectedly, or a particular transmission may not be successfully received for unforeseen reasons. Modification of the scheduled transmissions may include addition or removal of transmission time segments, alteration of a transmission start or end time, or conversion of a transmission from a multicast to a unicast transmission (or vice versa).

As described above, the embodiment depicted in FIG. 3 depicts the transmission scheduler prioritizing, above other maximization criteria, multicast transmissions capable of transmitting the entire dataset to a maximum number of tails in the fleet that are simultaneously ASA. In other embodiments of the present invention, though, determining a time segment (and data) for transmission may include additional or alternative considerations, preferences, and/or weightings of one or more other of the transmission maximization criteria (e.g. maximum/minimum transmission duration, usage/cost of IFC, maximum number of tails in transit or ASA, maximum size of data to be transmitted, transmission bit rate, and/or transmission bandwidth). Based on one or more different maximization criteria, slight or significant differences in generated transmission schedules may be observed. To illustrate, some other example scenarios and/or embodiments are described below.

In an embodiment, determining a time segment for transmission may include determining a particular time segment (from all possible time segments included in the time interval) having the maximum length of time during which a maximum number of tails in the fleet are scheduled to be or simultaneously ASA or in transit, and scheduling a transmission for the particular time segment.

In an embodiment, the transmission scheduler may determine that the entire dataset is to be transmitted in a single multicast transmission. In other words, the transmission scheduler may determine a time segment (from all possible time segments included in the time interval) during which some, or all, tails in the fleet are scheduled to be simultaneously ASA, where the time segment is of sufficient duration for transmission of the entire dataset. In this embodiment, the transmission scheduler determines a transmission bit rate in order to successfully transmit the entire dataset over the length of the determined time segment. For example, given a ten minute time segment (600 s) and a dataset of 300 Mb, the transmission scheduler 206 may schedule a multicast with a bit rate of 0.5 Mb/s.

In some embodiments, the transmission scheduler may have previously received or determined one or more transmission constraints prior to scheduling of a transmission, and further parameters for transmission of data may be computed based on the known transmission constraint(s). For example, in one embodiment, the unicast/multicast transmission bit rate may be fixed bit rate (e.g. 1 Mb/s). In another embodiment, a duration of the time segment for transmission may be known. For example, the transmission scheduler may determine that a subset of tails are scheduled to be simultaneously ASA for a duration of 10 minutes. Based upon either or both of the bit rate and simultaneous ASA duration determinations, the transmission scheduler may determine a size of a data portion to transmit. For example, the transmission scheduler may generate a schedule to transmit a 150 Mb portion of a 400 Mb dataset during a particular transmission. Alternatively, the transmission scheduler may determine a transmission may transmit the entire dataset, notwithstanding the one or more transmission constraints.

In an embodiment, the transmission scheduler may determine a size of a data portion or dataset to be transmitted to a subset of tails. The transmission scheduler may also initially determine a maximum allowed data transmission bit rate. By dividing a size of data by the maximum allowed data transmission bit rate, the transmission scheduler may determine a minimum duration of transit or simultaneous ASA time required for transmission of the data. In determining a time segment for transmission, the transmission scheduler determines a time segment of a length that is at least the minimum transit duration.

In these and other embodiments, the determination of a time segment may include further constraints. For example, it will be understood that the communication bandwidth used for unicast and multicast transmissions in the present invention may be subject to periods of particularly high or low usage. Further, cost of usage of this bandwidth may vary. It would be advantageous to schedule unicast and multicast transmission at times of lowest bandwidth usage and cost. Thus, the transmission scheduler, in determining a time segment for transmission of data, may determine a time period of low usage or cost of an in-flight connectivity bandwidth available to tails in the fleet of tails. Possibly, transmissions may only be scheduled to take place during anticipated periods of low usage or cost. Alternatively, in determining one or more time segments for data transmission, the transmission scheduler may assign a "weight" to estimates of in-transit connectivity bandwidth cost or usage. In other words, time segment coinciding with a period of high bandwidth cost or usage may not be used for transmissions when a similar time segment is available in a period of low bandwidth usage or cost.

In any case, it should be clear a first scheduled multicast transmission may not deliver the entirety of the dataset to each tail in the fleet. It is possible that a first multicast transmits a first portion of the dataset to a subset of the tails, and thus, further scheduling may be necessary with respect to the fleet, such that each tail receive the entirety of the dataset before the deadline. The transmission scheduler may, based on flight schedules of tails in the fleet, determine a second time segment for delivering another portion of the dataset to another subset of tails, and the transmission scheduler may schedule a second multicast transmission based on these determinations. The determinations and scheduling for the second multicast transmission may involve similar calculations and considerations as used in scheduling the first transmission. If a second scheduled transmission cannot deliver all remaining portions of the dataset to all remaining tails, the transmission scheduler may determine additional time segments for multicast or unicast satellite transmissions of remaining portions of the dataset to remaining tails in the fleet. By scheduling a multitude of multicast and unicast transmissions of portions of the dataset to subsets of tails, the transmission scheduler may generate a schedule that, when executed, may result in the full transmission of the dataset to all tails in the fleet before the end of the time interval.

Figure 4A:
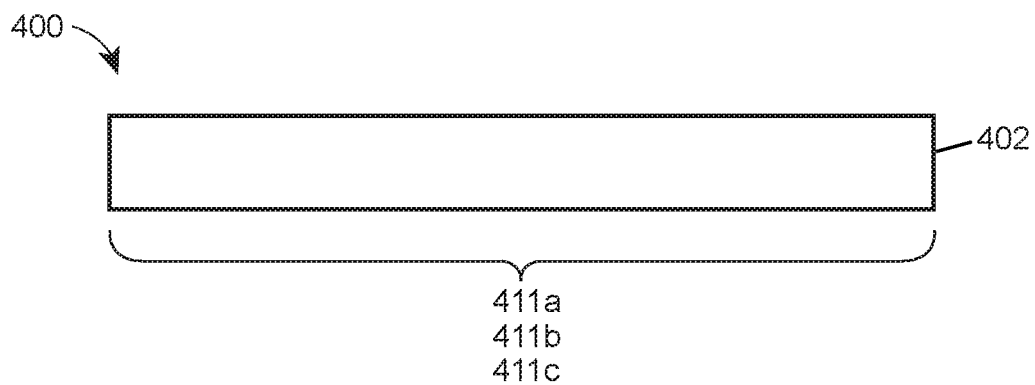
FIGS. 4a-4c illustrate example scenarios wherein multicast transmissions are scheduled.
Figure 4B:
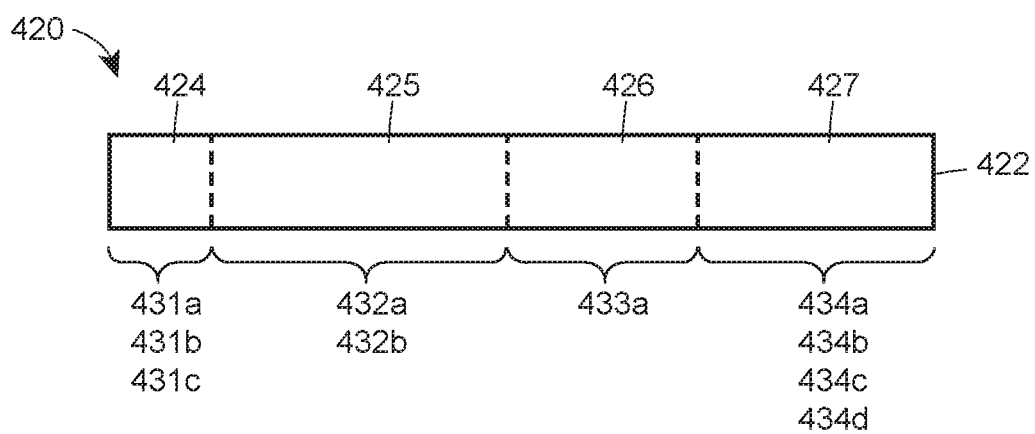
Figure 4C:
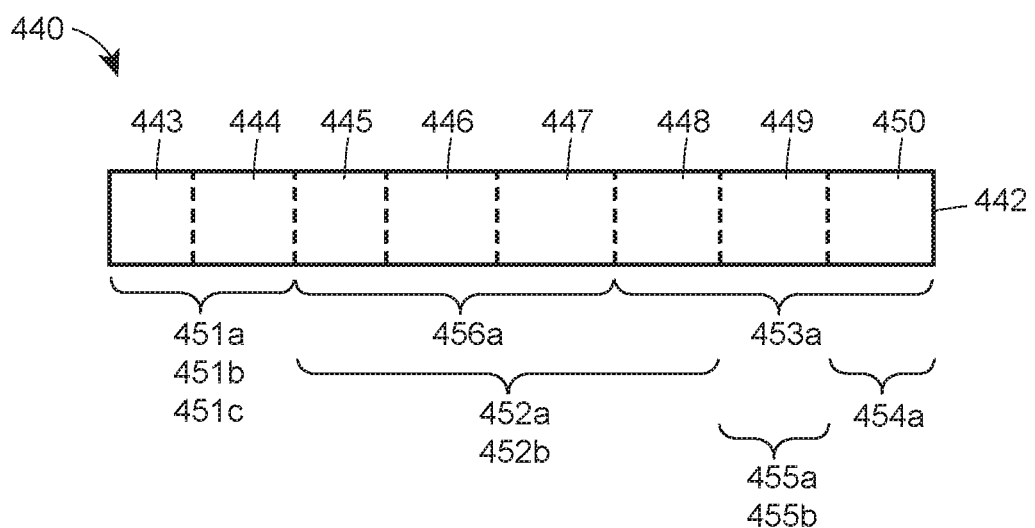

FIGS. 4a, 4b, and 4c illustrate possible satellite transmission schedules that a transmission scheduler (such as the transmission scheduler 206) may generate, based on respective transit schedules of tails in a fleet, for delivery of a dataset to each tail in the fleet. It is to be understood that these transmission schedules are only exemplary, and may not fully reflect the number of transmissions or scheduling complexity that may be necessary to best transmit a dataset to a fleet of tails. Further, it is to be understood that the resultant transmission schedules discussed herein may be realized by scheduling transmissions according to any one or more of the transmission maximization criteria described in this detailed description. Finally, it is to be understood that the FIGS. 4a-4c merely depict scheduled transmissions. It may be possible, or even necessary, for the transmission scheduler to modify or augment the transmission schedule with alternative or additional multicast and/or unified transmissions, for example, if flight schedules change or if one or more tails do not receive data as expected.

In each of FIGS. 4a-4c, the respective rectangle represents the entirety of a data set that is to be transmitted to a fleet of tails. Additionally, in the embodiments depicted in FIGS. 4a-4c, the numbering of transmissions and data portions is used simply to distinguish one element from another. The numbering is not intended to suggest that a particular transmission is scheduled or is to be executed before or after another transmission. In fact, scheduled transmissions may proceed in any order.

FIG. 4a depicts an example transmission schedule 400 for delivery of a dataset 402 to a fleet of tails. In the embodiment 400, each transmission is scheduled to transmit the entire dataset 402 to at least a subset of tails in the fleet. While transmission of the entire dataset in a single multicast transmission may not be possible in every embodiment, it is possible that an uncapped or very high transmission bit rate, a small dataset, and/or a long time segment during which a subset of tails are simultaneously ASA, may enable such a transmission.

Still referring to FIG. 4a, the transmission scheduler schedules a multicast transmission 411a to deliver the entire dataset to at least a subset of tails in the fleet. The transmission scheduler schedules another multicast transmission 411b to deliver the entire dataset to remaining tails not scheduled to receive the multicast transmission 411a. Finally, the transmission scheduler schedules a transmission 411c to deliver the entire dataset to remaining tails, such that each tail may be scheduled to receive the entire dataset.

In some embodiments, each of transmissions 411a-411c may be multicast transmissions. In other possible embodiments, one or more of the transmissions may be unicast transmissions. For example, transmissions 411a and 411b, when combined, may transmit the entirety of the dataset to all but one remaining tail in the fleet, and transmission 411c may be a unicast transmission of the entire dataset to the one remaining tail.

FIG. 4b illustrates another possible example transmission schedule 420 for delivery of a dataset 422 to a fleet of tails.

To assist in generation and/or execution of the transmission schedule 420, a ground processing system (such as the ground processing system 207) may split the dataset 422 into smaller data portions 424, 425, 426, and 427, which may be of same or different size. The transmission scheduler may schedule multicast satellite transmissions such that each tail in the fleet is scheduled to receive each data portion. In some embodiments, the ground processing system may separate the dataset into data portions according to the generated transmission schedule 420 (in other words, the transmission schedule 420 may dictate the portioning of data portions 424-427). In other embodiments, the ground processing system may first separate the data portions, from which the transmission scheduler may generate respective transmission schedules separately for each data portion.

The resultant transmission schedule may include transmissions 431a-431c. Each transmission 431a-431c may be scheduled to transmit at least the data portion 424 to at least a subset of tails in the fleet. Each of the transmissions 431a-431c may be a multicast transmission. Alternatively, one or more of the transmissions 431a-431c may be a unicast transmission. For example, transmissions 431a and 431b may be multicast transmissions scheduled to transmit the data portion 424 to all but one tail remaining in the fleet, and the transmission 431c may be a unicast transmission of the data portion 424 to a final remaining tail.

Transmissions 432a and 432b may be similarly scheduled to transmit the data portion 425 to the fleet of tails, and transmissions 434a-434d may be similarly scheduled to transmit the data portion 427 to the fleet of tails. Further, it will be understood that, when data portioning is enabled, it may be possible to transmit a portion of the dataset to all tails in the fleet in a single multicast transmission, and thus, transmission 433a may be scheduled to transmit the data portion 426 to all tails in the fleet. It will be clear that, depending on the scheduled ASA times of tails in the fleet, the total number of multicast and/or unicast transmissions may vary significantly.

FIG. 4c illustrates yet another example transmission schedule for delivery of a dataset 442 to a fleet of tails. The transmission schedule of the embodiment 440 includes multicast and unicast transmissions of overlapping data portions, illustrating the complexity of the transmission schedules that a transmission scheduler may generate, according to one or more transmission maximization criteria, for delivery of a dataset to a fleet of tails.

To assist in generation and/or execution of the transmission schedule 440, the ground processing system may split the dataset 422 into smaller data portions 443-450, which may be of same or different sizes. The transmission scheduler may schedule multicast satellite transmissions such that each tail in the fleet is scheduled to receive the dataset. In some embodiments, the ground processing system may separate the dataset into the particular data portions 443-450 according to the generated transmission schedule (in other words, the transmission schedule 440 may dictate the portioning of data portions 443-450). In other embodiments, the ground processing system may first portion the data portions, and the transmission scheduler may generate the transmission schedule 440 in consideration of the data portions 443-450.

Still referring to FIG. 4c, each of transmissions 451a-451c are scheduled to transmit a same portion of data (comprising portions 443 and 444) to at least a subset of tails in the fleet. Each of transmissions 451a-451c may be multicast satellite transmissions. Alternatively, one or more of transmissions 451a-451c may be unicast satellite transmissions.

Transmissions 452a and 452b are each scheduled to transmit a larger portion (including portions 445-448) of the dataset to at least a subset of tails in the fleet. In some embodiments, a transmission scheduler may prioritize (as a transmission maximization criteria) scheduling larger transmissions before smaller transmissions. In other words, the smaller transmissions may be scheduled to "patch" gaps in the transmission schedule 440 that exist even after scheduling of larger transmissions.

A transmission 453a is scheduled to transmit a portion (comprising portions 448, 449 and 450) of the dataset 442 to at least a subset of tails in the fleet. It is to be noted that, in this schedule, the data of transmission 453a overlaps with the data of transmissions 452a-b. However, this overlap may be advantageous, and in some cases, necessary. For example, while one tail may be available to receive the entirety of the dataset via transmissions 451a, 456a, and 453a, another one or more tails in the fleet may not be available to receive transmissions via the same three transmissions. Accordingly, the another one or more tails may each be scheduled to receive the dataset via a separate one or more transmissions (e.g., transmissions 451c, 452a, 455a, and 454a).

Transmissions 454a, 455a, and 455b may be, for example, multicast and/or unicast transmissions scheduled to transmit smaller portions of the dataset 442 to at least a subset of tails in the fleet. In some embodiments, these smaller, "surgical" transmissions may be scheduled to account for any tails and/or data not accounted for by previously scheduled transmissions.

Figure 5:
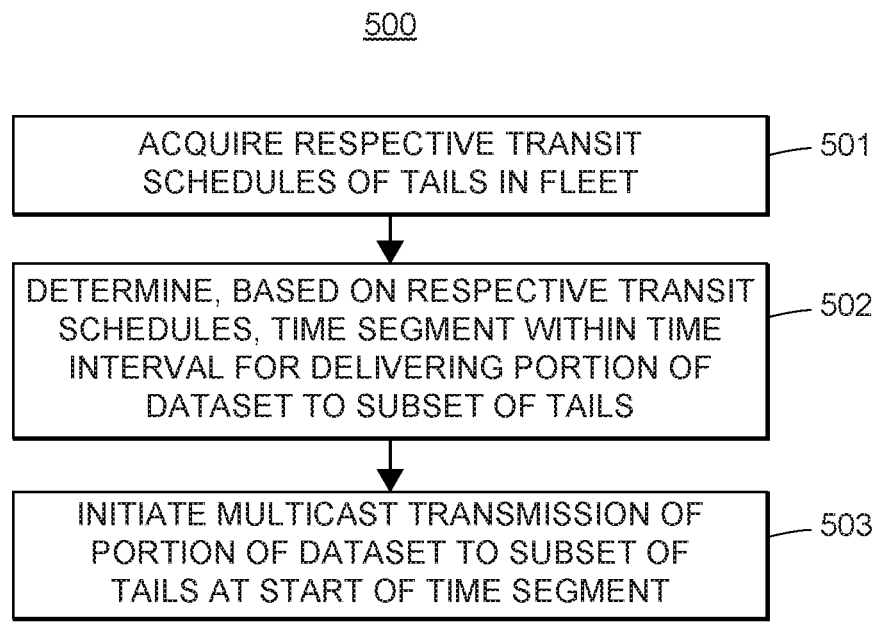
FIG. 5 is a flow diagram of an example method for multicasting a portion of a dataset to a subset of aircraft in a fleet.

FIG. 5 is a flow diagram depicting an example method for transmitting, within a time interval, a portion of a dataset to a subset of tails in a fleet of tails via a multicast transmission. Generally, execution of the blocks 501-503 shown in FIG. 5 may utilize the methods and systems shown in FIGS. 1 and 2 and described elsewhere in this detailed description. In an embodiment, the transmission scheduler 105 and/or the ground processing system 106 may perform at least a portion of the method 500.

At a block 501, the method 500 may include acquiring respective transit schedules of tails in a fleet. The respective transit schedules may be acquired by a transmission scheduler such as the transmission scheduler 206 via wired and/or wireless connections. At a minimum, the respective transit schedules may include the transit schedules of each of the fleet of tails from a start time until a deadline before which the dataset is desired to be present aboard each of the tails. Transit schedules for each tail may include details regarding specific phases of transit. For example, a transit schedule for a particular tail may include not only origins, destinations, and takeoff/landing times, but also further indicating expected altitude at various times during flight (and hence, times above the ASA threshold). If respective transit schedules do not include expected altitudes, the transmission scheduler may estimate times during which respective tails are expected to be ASA based on the respective transit schedules available.

At a block 502, the method 500 may include determining, based on the respective transit schedules acquired in block 501, a time segment within a time interval for delivering at least a portion of the dataset to a subset of tails in the fleet of tails. In other words, the block 502 may include determining (i) the time segment within the time interval for delivering at least a portion of the dataset, (ii) the portion of the dataset to transmit, and (iii) the tails in the subset of tails to receive the at least a portion of the dataset.

Alternatively, one or more of the above determinations may be made prior to execution of the block 502 (i.e., predetermined). For example, a known constraint may be in place, whereby a transmission will always be scheduled to transmit the entirety of the dataset (thus, the data to be transmitted is predetermined and may not be determined at block 502). In any case, the block 502 may be performed, for example, by a transmission scheduler 206 as shown in FIG. 2.

The time segment during the time interval may be any length of time during which one or more of the tails are capable of receiving a satellite transmission (i.e., are ASA or simultaneously ASA). The time interval may be the period of time between acquisition of the flight schedules via block 501 and a deadline for delivery of the dataset to the tails in the fleet. The time segment may be determined by identifying a time segment during which a maximum number of tails in the fleet are scheduled to be simultaneously in transit or ASA. However, additionally or alternatively, determination of a time segment may include other considerations as well, such as any one or more of the transmission maximization criteria described in this detailed description. For example, a time segment may be scheduled at a time during which in-flight connectivity bandwidth is expected to be at a minimum usage or cost.

Determination of the time segment may additionally or alternatively involve computation of other parameters for data transmission. For example, the length of the time segment may be determined by determining a maximum length of time during which a maximum number of tails are scheduled to be simultaneously ASA. In another embodiment, based on duration of the time segment and/or an available multicast transmission rate/bandwidth, a size of the portion of the dataset may be determined. From these calculations, the portion of the dataset may, in fact, be the entire dataset.

In yet another embodiment, determination of a time segment for transmission may include an initial determination of a minimum transit duration, which may be computed by a size of a portion of a dataset to transmit by a maximum allowed data transmission bit rate. This minimum transit duration may be the minimum amount of time required to transmit a predetermined portion of the dataset, given the maximum allowed bit rate. In this embodiment, only time segments with a length equal to or greater than the minimum transit duration may be determined.

In any case, at a block 503, the method 500 may include initiating a multicast transmission of at least a portion of the dataset may be initiated at the start of the time segment, in accordance with the determinations of block 302.

Figure 6:
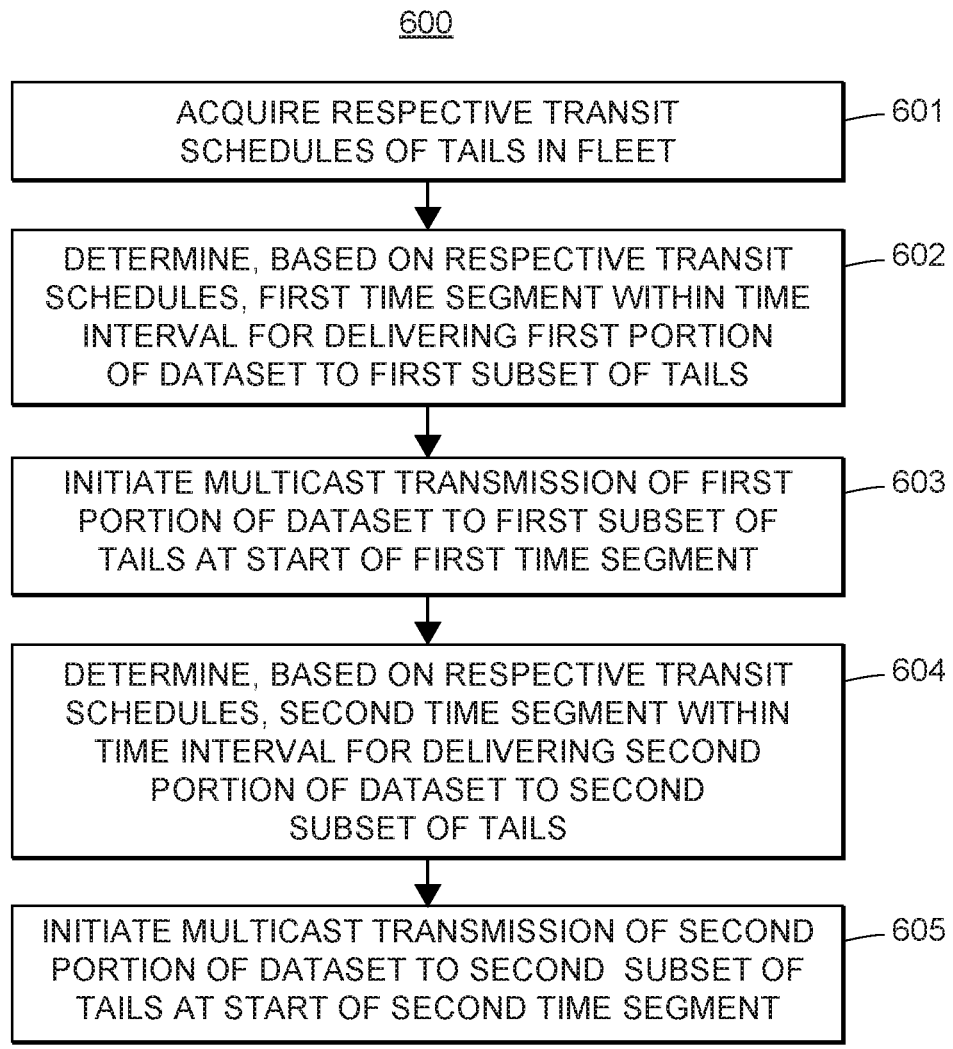
FIG. 6 is a flow diagram of an example method for multicasting a first portion of a dataset to a first subset of aircraft in a fleet, and subsequently multicasting a second portion of the dataset to a second subset of aircraft in the fleet.

FIG. 6 is a flow diagram depicting an example method for transmitting, within a time interval, a first portion and a second portion of a dataset to a first subset and second subset of tails in a fleet, respectively, via multicast transmissions. Generally, execution of the blocks 601-605 shown in FIG. 6 may utilize the methods and systems shown in FIGS. 1 and 2 and described elsewhere in this detailed description.

In an embodiment, blocks 601-603 may proceed similarly to the blocks 501-503 of FIG. 5. For example, at a block 601, the method 600 may include acquiring respective transit schedules of tails in the fleet. At a block 602, the method 600 may include determining, based on the respective transit schedules, a first time segment within the time interval for delivering a first portion of the dataset to a first subset of tails. In other words, the block 602 may include determining (i) the first time segment within the time interval, (ii) the first portion of the dataset to transmit during the first time segment, and (iii) the tails in the first subset of tails to receive the at first portion of the dataset. Alternatively, one or more of the above determinations may be made prior to execution of the block 602 (i.e., predetermined, and thus not determined at the block 602).

At a block 603, the method 600 may include initiating a multicast transmission of the first portion of the dataset to a first subset of tails at the start of the first time segment.

It is possible that, following the multicast transmission initiated in block 603, not every tail in the fleet may have received the entire dataset. In fact, unless the first time segment allows for transmission of the entire dataset to every tail in the fleet, additional transmission(s) may be required. In these scenarios, at a block 604, the method 600 may include determining, based on the respective transit schedules, a second time segment within the time interval for delivering a second portion of the dataset to a second subset of tails. In other words, the block 604 may include determining (i) the second time segment within the time interval, (ii) the second portion of the dataset to transmit during the second time segment, and (iii) the tails in the second subset of tails to receive the at second portion of the dataset. Alternatively, one or more of the above determinations may be made prior to execution of the block 604 (i.e., predetermined, and thus not determined at the block 604).

The second multicast transmission may result in transmission of a second portion of the dataset to a second subset of tails that did not receive the second portion of the dataset in the first multicast transmission. Hence, the second portion of the dataset may be partially or entirely incongruent to the first portion of the dataset. In other words, the second portion of the dataset may include data not included in the first portion, and/or vice versa. Further, the second subset of tails may be entirely incongruent to the first subset of tails. To provide an example from FIG. 2, if a first multicast transmission involves transmitting a first portion of the dataset to tails 210a-210d, then a second multicast transmission may involve (i) the second portion of the dataset being a different portion from the first portion of the dataset, or (ii) the second subset of tails being different from the first subset of tails. Combinations of both (i) and (ii) will be evident. In any case, the second transmission may further the transmission of the whole of the dataset to the entirety of the fleet.

At a block 605, the method 600 may include initiating a multicast transmission of the second portion of the dataset to the second subset of tails may be initiated at the start of the second time segment, in accordance with the determination of block 604.

The determination of the first and second time segments may also include determination of the one or more tails to receive each transmission, as well as determination of the data to be transmitted in each transmission. Determinations of the respective first and second time segments at respective blocks 602 and 604 may include determination, prioritization, and/or weighting of any one or more of the transmission maximization criteria described in this detailed description. For example, determination of either or both time segments may include determining a maximum length of time during which the maximum number of tails in the fleet are scheduled to be ASA, determining a minimum ASA duration, or determining a period of low usage or cost of in-flight connectivity. Further, determination of a time segment may include, based on duration of the time segment and/or a multicast transmission bit rate, a size of the portion of the dataset to transmit. Furthermore, in some implementations, the first and/or second portion of the dataset may be the entirety of the dataset.

In one embodiment, blocks 601-605 may proceed in the order illustrated in FIG. 6. In alternative embodiments, however, the order of occurrence of blocks 601-605 may be subject to change. For example, in one embodiment, both the first and the segment time segments may be determined before the initiation of either of the transmissions themselves. In this embodiment, block 602 may be followed by block 604, and both transmissions may be initiated after the scheduling of the two transmissions. Further, additional blocks or method elements may be added and/or removed from the method 600.

The use of ordinal numbering (i.e. "first" and "second") to describe determined time segments is included for ease of reading (and not to suggest temporal relation of the time segments). In some embodiments, depending on the time segments determined at blocks 602 and 604, the "second" determined time segment of block 604 may actually have a start time before the start time of the "first" determined time segment of block 602. In this case, the multicast of block 605 may be initiated before the multicast of block 603 is initiated.

Figure 7:
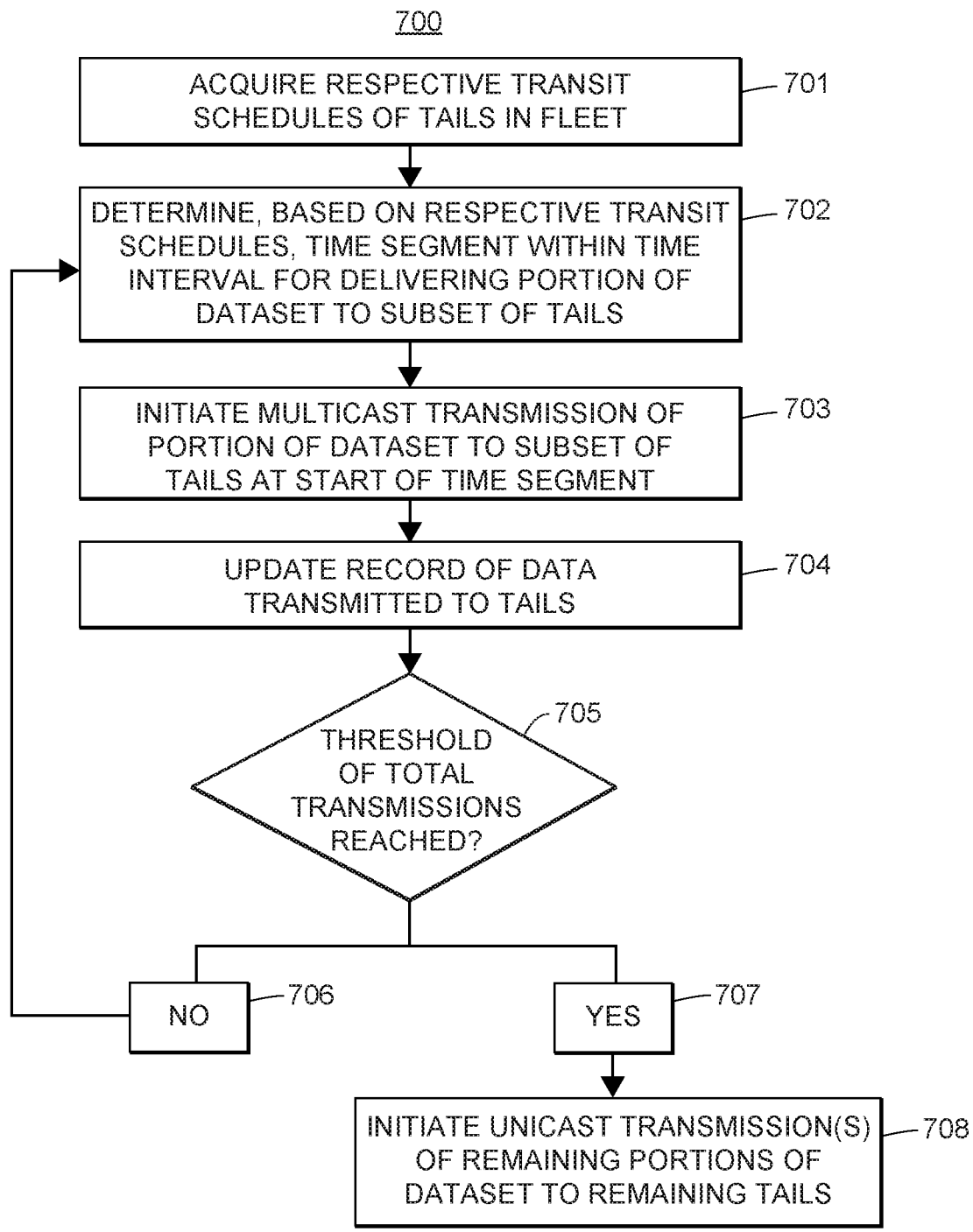
FIG. 7 is a flow diagram of an example iterative method for transmitting an entire dataset to an entire fleet of aircraft.

FIG. 7 is a flow diagram depicting an example, iterative method for transmitting, within a time interval, a multiplicity of portions of a dataset to a multiplicity of tail subsets, respectively, via a multiplicity of multicast and unicast transmissions. Generally, execution of the blocks 701-708 shown in FIG. 7 may utilize the methods and systems shown in FIGS. 1 and 2 and described in this detailed description.

In an embodiment, the blocks 701-703 may execute similarly to the blocks 701-703 of FIG. 5 and/or to the blocks 601-603 of FIG. 6. For example, at a block 701, the method 700 may include acquiring respective transit schedules of tails in the fleet. At a block 702, the method 700 may include determining based on the respective transit schedules, a time segment within the time interval for delivering at least a portion of the dataset to a subset of tails. In other words, the block 702 may include determining (i) the time segment within the time interval, (ii) the portion of the dataset to transmit during the time segment, and (iii) the tails in the subset of tails to receive the at portion of the dataset. Alternatively, one or more of the above determinations may be made prior to execution of the block 704 (i.e., predetermined, and thus not determined at the block 704).

The first time segment may be determined at a transmission scheduler which may be, for example, the transmission scheduler 206 of FIG. 2. At a block 703, the method 700 may include initiating a multicast transmission of the at least a portion of the dataset to the subset of tails at the start of the time segment.

To achieve iterative delivery of an entire dataset to an entire fleet of tails, a transmission scheduler may maintain a record for tracking which portions of a dataset have been transmitted and delivered to each tail in the fleet. This record may, for example, be implemented on a computer memory associated with the transmission scheduler. At a block 704, the method 700 may include updating a record of data transmitted (or scheduled and thus expected to be transmitted) to tails, to reflect the transmissions that have been initiated (or scheduled to be initiated at the start of a respective time segment).

With each iteration of scheduling, the total amount of the dataset scheduled to be transmitted to a fleet of tails may approach completion (100 percent of the dataset transmitted to 100 percent of the tails in the fleet). One skilled in the art will understand that as transmissions approach completion, unicast satellite transmission of remaining data to remaining tails may become a more attractive option. For example, given the fleet of tails 210a-210g of FIG. 2, if the only remaining data portions to transmit are incongruous data portions for tails 210a, 210f, and 210g (e.g., referring to FIG. 4C, the tails 210a, 210f, and 210g need data portions 443, 445, 449, respectively) unicasting those remaining data portions may clearly be the most effective option to complete delivery. Thus, at a block 705, the method 700 may include determining whether total scheduled transmissions have reached a predetermined data transmission threshold (e.g., 80 percent of the dataset scheduled to be transmitted to each respective tail, or 90 percent of the dataset scheduled to be transmitted to at least 75 percent of the tails). The predetermined data transmission threshold may be, for example, a threshold determined and/or stored at the transmission scheduler, or a threshold input by a human operator.

At a block 706, the method 700 may include determining that total transmissions have not at least met or exceeded the threshold. The threshold may be based on, for example, (i) total size of data transmitted, (ii) number of tails that have received the entire dataset, or (iii) a combination of (i) and (ii). This determination may cause the flow of the method 700 to be redirected to block 702, for example, wherein another time segment may be determined for transmission of another portion of the dataset to another subset of tails. For this and subsequent determinations (if more scheduling is necessary), the transmission scheduler may determine a portion of the dataset to transmit to a subset of tails based on the stored record of data transmitted to tails. Thus, the transmission scheduler may avoid unnecessary duplicative scheduling, and instead focus scheduling on those portions of data and tails that have not been covered by previous transmissions. Through successive iteration of blocks 702-706, the total amount of data transmitted collectively to the fleet of tails may approach the data transmission threshold.

Thus, at a block 707, the method 700 may include determining that ("YES") total transmissions have at least met or exceeded the threshold. At a block 708, the method 700 may include scheduling and/or initiating one or more unicast transmissions of remaining portions (those not scheduled to be transmitted already) of the dataset to remaining tails in the fleet.

If, at block 705, the transmission scheduler determines that the total transmission threshold has not been reached, flow may proceed to block 706, and block 702 may be repeated. The determination of the time segments may also include determination of the one or more tails to receive each transmission, as well as determination of the data to be transmitted in each transmission. Determinations of any of the time segments at block 702 may include determination, prioritization, and/or weighting of any one or more of the transmission maximization criteria described in this detailed description. For example, determination of one or more time segments may include determining a maximum length of time during which the maximum number of tails in the fleet are scheduled to be simultaneously ASA, determining a minimum simultaneous ASA duration, or determining a period of low usage or cost of in-flight connectivity. Further, determination of a time segment may include, based on duration of the time segment and/or a multicast transmission bit rate, a size of the portion of the dataset to transmit.

In one embodiment, blocks 701-708 may proceed in the order illustrated in FIG. 7. In alternative embodiments, however, the order of occurrence of blocks 701-708 may be altered. For example, in another embodiment, the transmission scheduler may determine all transmission time segments before the initiation of any of the transmissions themselves. In this embodiment, block 703 may not be executed immediately after block 702. For example, multicast and unicast transmissions may begin execution after the transmission scheduler has generated a full schedule by which the entirety of the dataset may be transmitted to every tail. This embodiment for additional time segments to be scheduled and multicasts initiated at times between blocks 702 and 703. If, at some point, if a tail does not receive a scheduled transmission as expected, the transmission scheduler may modify or augment the schedule by determining one or more additional transmission time segments to retransmit data from a failed transmission. Further, additional blocks or method elements may be added and/or removed from the method 700.

Figure 8:
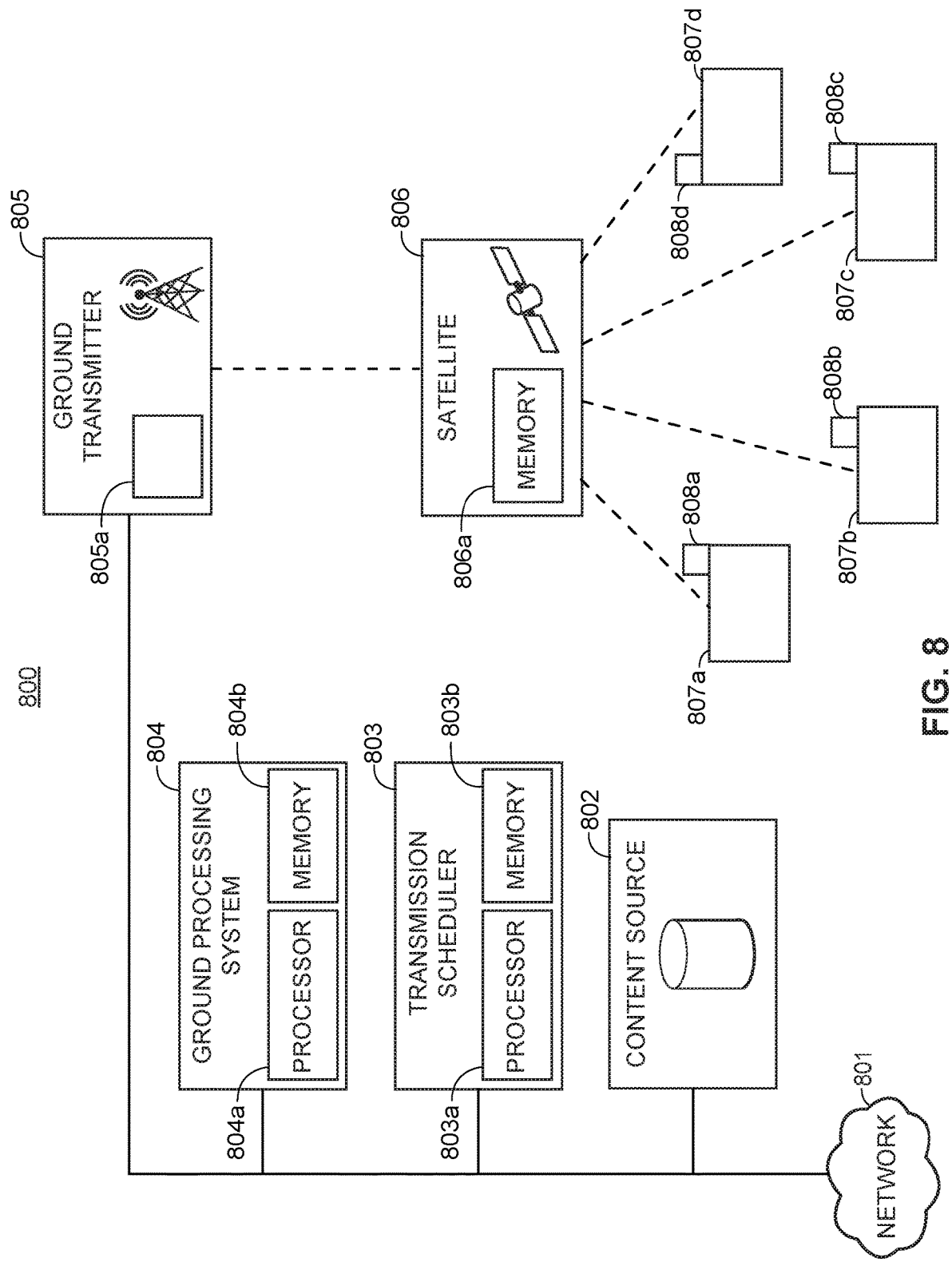
FIG. 8 is a block diagram illustrating example system components for satellite transmissions of data to aircraft in a fleet.

FIG. 8 illustrates system components for transmission of a portion of or an entirety of a dataset to tails in a fleet. At least some of the components of FIG. 8 may be included in the systems described in FIGS. 1 and 2, if desired. Additionally or alternatively, at least some of the components of FIG. 8 may perform the portioning and scheduling activities described with respect to FIGS. 3 and 4, and/or may perform at least a portion of the methods described with respect to FIGS. 5-7. Further, although a multicast transmission to four tails is illustrated in FIG. 8, it will be clear that a multicast transmission to a larger or smaller set or subset of tails is possible. Still further, the system components illustrated in FIG. 8 may be used for a transmission to a single tail, in the case of a unicast satellite transmission. Components of the system of FIG. 8 may be connected, for example, via one or more wired and/or wireless connections over one or more public and/or private network.

A dataset may originate from a physical content source such as a physical storage medium or server 802. Alternatively, the dataset may originate from one or more remote content sources and be obtained via a network 801. The network 801 may be one or more wired and/or wireless network, and may be one or more public and/or private network.

A transmission scheduler 803 may schedule one or more multicast or unicast satellite transmissions to deliver at least a portion of the dataset to at least a subset of the tails in the fleet. The transmission scheduler may comprise one or more memories 803b and one or more processors 803a. The one or more memories 803b contain non-transitory computer-executable instructions that, when executed by the one or more processors 803a, cause the transmission scheduler 803 to perform computing functions described herein to iteratively determine time segments for multicast satellite transmissions of data to the tails 807a-807d in the fleet, each of which may include one or more satellite antenna 808a-808d, respectively.

At some point before the dataset needs to be delivered to tails 807a-807d in the fleet, the transmission scheduler acquires flight schedules for each respective tail 807a-707d in the fleet from a flight schedule service provider via the network 801. The flight schedules may include indications of the times during which each tail is scheduled to be simultaneously ASA. Otherwise, the transmission scheduler 803 may compute expected ASA times from the respective flight schedules. Regardless, the one or more memories 803b may store respective flight schedules and/or expected ASA times.

Further, the transmission scheduler 802 may also retrieve information regarding the dataset. While access to the entire dataset itself (e.g. a video file) may not be necessary for the purposes of scheduling transmissions, it is clear that metadata pertaining to the dataset (e.g. size or length of the video file) may be useful in some embodiments of this invention.

The system components illustrated in FIG. 8 may perform the methods of multicast and/or unicast transmission described herein. The transmission scheduler 802 may generate a transmission schedule according to one or more of the maximization criteria described in this detailed description.

The schedule for multicast/unicast transmissions generated by the transmission scheduler 803 may be forwarded to a ground processing system 804, and the ground processing system may store the schedule at one or more memories 804b. The ground processing system 804 may also acquire the dataset to be transmitted, and store the dataset at the one or more memories 804b. The one or more memories 804b also contain non-transitory computer-executable instructions that, when executed on one or more processors 804a, cause the ground processing system 804 to partition the dataset, when transmission of only a portion of the dataset is scheduled to take place in a particular transmission. For example, a multicast transmission may be scheduled to transmit a third of a dataset. The ground processing system 804 may break off a third of the dataset to be transmitted. In another example, a unicast is scheduled to "patch" a missed portion of data to a tail, and the ground processing system 804 breaks a small segment of the dataset for the unicast transmission.

The ground processing system 804 may forward the transmission schedule, dataset, and any divided portions of the dataset to one or more ground transmitters 805. The ground transmitter may include a computing device 805a in communication with the ground processing system 804, and the computing device 805a may support transfer of data between the ground processing system 804 and transmission scheduler 803 and one or more satellites 806. The ground transmitter may accumulate the data via known communication protocols.

The satellite 806, upon receipt of the transmission schedule and data, may store the information at one or more memories 806a in advance of the transmission start times. At the transmission start times, as defined by the transmission schedule, the satellite 806 may initiate multicast or unicast transmissions to one or more of the tails 807a-807d based on the determinations of the transmission schedule 803. Each recipient tail may receive the transmission at a respective satellite antenna 808a-808d and may store the received data on an airborne storage platform aboard the tail. In return, each tail may reply with an acknowledgment of receipt to the satellite 806 and/or to the ground transmitter 805. Thus, in the event that one or more tails fail to receive data, retransmissions may be scheduled by the transmission scheduler 803.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A method of optimizing a delivery of a dataset to a fleet of a plurality of aircraft while the plurality of aircraft are in-flight, the method comprising:

dividing a time interval into a plurality of time segments, the time interval corresponding to a length of time during which the dataset is to be delivered to each aircraft of the plurality of aircraft, and the plurality of time segments being a plurality of consecutive, mutually exclusive time segments;

based on respective transit schedules of the plurality of aircraft over the time interval, for each time segment of the time interval, determine a respective number of aircraft that are scheduled to be in-flight for an entirety of the each time segment;

determining a particular time segment, of the plurality of time segments, that has a greatest number of aircraft that are scheduled to be in-flight as compared to the other time segments of the plurality of time segments;

determining one or more portions of the dataset that are to be delivered to each aircraft that is scheduled to be in-flight for the entirety of the particular time segment; and upon a start of the particular time segment, initiating a multicast transmission to the in-flight aircraft associated with the particular time segment, the multicast transmission including the one or more portions of the dataset.

2. The method of claim 1, wherein the aircraft that are scheduled to be in-flight during the particular time segment are scheduled to be simultaneously in-flight above a service altitude for the entirety of the particular time segment.

3. The method of claim 1, further comprising determining, based on at least one of (i) a duration of the particular time segment, (ii) a multicast transmission rate, or (iii) a multicast transmission bandwidth, a size or quality level of the one or more portions of the dataset.

4. The method of claim 1, further comprising determining, based on a duration of the particular time segment, a multicast transmission rate for transmission of the one or more portions of the dataset.

5. The method of claim 1, wherein determining the particular time segment comprises determining a maximum continuous length of time during which the greatest number of aircraft are scheduled to be simultaneously in-flight, the maximum continuous length of time comprising the particular time segment and one or more portions of a second time segment of the plurality of time segments, the second time segment being immediately adjacent to the particular time segment.

6. The method of claim 1, wherein the one or more portions of the dataset are a first one or more portions of the dataset, the particular time segment is a first time segment within the time interval, and the greatest number of aircraft is a first subset of the plurality of aircraft, and wherein the method further comprises:
based on the respective transit schedules of a remainder of the plurality of aircraft excluding the first subset, for each remaining time segment of the time interval excluding the first time segment, determining a respective number of the remainder of the plurality of aircraft that are scheduled to be in-flight for the entirety of the each remaining time segment;
determining a second time segment, of the remaining time segments of the time interval, that has a greatest number of the remainder of the plurality of aircraft that are scheduled to be in-flight as compared to respective numbers of aircraft that are scheduled to be in-flight for the entirety of each of the other time segments of the remaining time segments; and
determining a second one or more portions of the dataset that are to be delivered to each aircraft that is scheduled to be in-flight during the second time segment.

7. The method of claim 1, wherein the determination of the particular time segment is further based upon at least of (i) a time period of low usage of an in-transit connectivity bandwidth available to one or more aircraft included in the plurality of aircraft, or (ii) a period of low cost of an in-transit connectivity bandwidth available to one or more aircraft included in the plurality of aircraft.

8. A method of optimizing a delivery of a dataset to a fleet of a plurality of aircraft while the plurality of aircraft are in-flight, the method comprising:
generating a transmission schedule for delivering the dataset to the plurality of aircraft over a time interval, wherein the generating of the transmission schedule is based on respective transit schedules of the plurality of aircraft over the time interval, and wherein the generating of the transmission schedule includes:
dividing the time interval into a plurality of consecutive, mutually exclusive time segments; and
defining a plurality of multicast transmissions, each multicast transmission of the plurality of multicast transmissions corresponding to a respective time segment of the plurality of consecutive, mutually exclusive time segments within the time interval, and each multicast transmission indicating a respective one or more portions of the dataset that are to be delivered, via multicasting during the respective time segment, to a respective subset of the plurality of aircraft, such that the generated transmission schedule defines a delivery of an entirety of the dataset to an entirety of the plurality of aircraft during the time interval,
wherein defining a particular multicast transmission of the plurality of multicast transmissions includes determining a particular time segment, of the plurality of consecutive, mutually exclusive time segments, that has a greatest number of aircraft that are scheduled to be in-flight for an entirety of the particular time segment, as compared to respective numbers of aircraft that are scheduled to be in-flight for an entirety of each of the other time segments of the plurality of time segments; and
initiating, for each multicast transmission of the defined plurality of multicast transmissions, a respective multicast delivery of the respective one or more portions of the dataset to the respective subset of the plurality of aircraft in accordance with the transmission schedule.

9. The method of claim 8, wherein, during each respective time segment corresponding to a respective multicast transmission, aircraft included in the corresponding respective subset of the plurality of aircraft are scheduled to be above a service altitude for the entirety of the respective time segment.

10. The method of claim 8, further comprising determining, based on at least one of (i) respective durations of the plurality of time segments, (ii) a multicast transmission rate, or (iii) a multicast transmission bandwidth, at least one of respective sizes or quality levels of the respective one or more portions of the dataset.

11. The method of claim 8, further comprising determining, based on respective durations of the respective time segments, respective multicast transmission rates for transmission of the respective one or more portions of the dataset.

12. The method of claim 8, wherein defining the plurality of multicast transmissions is based upon at least one of:
a determination of a time period of low usage of an in-transit connectivity bandwidth available to one or more of the plurality of aircraft, or
a determination of a period of low cost of an in-transit connectivity bandwidth available to one or more of the plurality of aircraft.

13. A system for optimizing a delivery of a dataset to a fleet of a plurality of aircraft while the plurality of aircraft are in-flight, the system comprising:
an input to obtain respective transit schedules of the plurality of aircraft over a time interval;
a transmission scheduler comprising computer-executable instructions that are stored on one or more memories and that, when executed by one or more processors, cause the system to
generate a transmission schedule for delivering the dataset to the plurality of aircraft over the time interval, wherein the generation of the transmission schedule is based on the respective transit schedules of the plurality of aircraft, and wherein the generation of the transmission schedule includes:
dividing the time interval into a plurality of consecutive, mutually exclusive time segments; and
defining a plurality of multicast transmissions, each multicast transmission of the plurality of multicast transmissions corresponding to a respective time segment of the plurality of consecutive, mutually exclusive time segments within the time interval, and each multicast transmission indicating a respective one or more portions of the dataset that are to be delivered, via multicasting during the respective time segment, to a respective subset of the plurality of aircraft, such that the generated transmission schedule defines a delivery of an entirety of the dataset to an entirety of the plurality of aircraft during the time interval, wherein defining a particular multicast transmission of the plurality of multicast transmissions includes determining a particular time segment, of the plurality of consecutive, mutually exclusive time segments, that has a greatest number of aircraft that are scheduled to be in-flight for an entirety of the particular time segment, as compared to respective numbers of aircraft that are scheduled to be in-flight for an entirety of each of the other time segments of the plurality of consecutive, mutually exclusive time segments; and a transmission subsystem that initiates, for each multicast transmission of the defined plurality of multicast transmissions, a respective multicast delivery of the respective one or more portions of the dataset to the respective subset of the plurality of aircraft in accordance with the transmission schedule.

14. The system of claim 13, wherein, during each respective time segment corresponding to a respective multicast transmission, aircraft included in the corresponding respective subset of the plurality of aircraft are scheduled to be simultaneously above a service altitude for the entirety of the respective time segment.

15. The system of claim 13, wherein the computer-executable instructions of the transmission scheduler further include instructions that, when executed by the one or more processors, cause the system to determine, based on at least one of (i) respective durations of the plurality of time segments, (ii) a multicast transmission rate, or (iii) a multicast transmission bandwidth, at least one of respective sizes or respective quality levels of the respective one or more portions of the dataset.

16. The system of claim 13, wherein the computer-executable instructions of the transmission scheduler further include instructions that, when executed by the one or more processors, cause the system to determine, based on respective durations of the respective time segments, respective multicast transmission rates for transmission of the respective one or more portions of the dataset to the respective subsets of the plurality of aircraft.

17. The system of claim 13, wherein the computer-executable instructions to generate the transmission schedule include instructions to define the respective time segments based upon at least one of (i) a time period of low usage of an in-transit connectivity bandwidth available to one or more of the plurality of aircraft, or (ii) a period of low cost of an in-transit connectivity bandwidth available to one or more of the plurality of aircraft.

18. The method of claim 8, wherein the particular multicast transmission is a first multicast transmission, the particular time segment is a first time segment of the plurality of consecutive, mutually exclusive time segments, and the greatest number of aircraft is a first subset of the plurality of aircraft, and wherein defining the plurality of multicast transmissions further includes, subsequent to determining the first time segment:

based on the respective transit schedules of a remainder of the plurality of aircraft excluding the first subset, for each remaining time segment of the time interval excluding the first time segment, determining a respective number of the remainder of the plurality of aircraft that are scheduled to be in-flight for the entirety of the each remaining time segment;

determining a second time segment, of the remaining time segments of the time interval, that has a greatest number of the remainder of the plurality of aircraft that are scheduled to be in-flight for the entirety of the second time segment, as compared to respective numbers of aircraft that are scheduled to be in-flight for the entirety of each of the other time segments of the remaining time segments; and determining one or more portions of the dataset that are to be delivered, via a second multicast transmission of the plurality of multicast transmissions, to each aircraft that is scheduled to be in-flight during the entirety of the second time segment.

19. The method of claim 8, wherein generating the transmission schedule further includes defining one or more unicast transmissions, each of the one or more unicast transmissions corresponding to another respective time segment of the plurality of consecutive, mutually exclusive time segments, and each unicast transmission indicating another respective one or more portions of the dataset that is to be delivered, via unicasting during the another respective time segment, to another one of the plurality of aircraft.

20. The system of claim 13, wherein the particular multicast transmission is a first multicast transmission, the particular time segment is a first time segment of the plurality of consecutive, mutually exclusive time segments, and the greatest number of aircraft is a first subset of the plurality of aircraft, and wherein the instructions to define the plurality of multicast transmissions further include instructions to, subsequent to determining the first time segment:

based on the respective transit schedules of a remainder of the plurality of aircraft excluding the first subset, for each remaining time segment of the time interval excluding the first time segment, determine a respective number of the remainder of the plurality of aircraft that are scheduled to be in-flight for the entirety of the each remaining time segment;

determine a second time segment, of the remaining time segments of the time interval, that has a greatest number of the remainder of the plurality of aircraft that are scheduled to be in-flight for the entirety of the second time segment, as compared to respective numbers of aircraft that are scheduled to be in-flight for the entirety of each of the other time segments of the remaining time segments; and determine one or more portions of the dataset that are to be delivered, via a second multicast transmission of the plurality of multicast transmissions, to each aircraft that is scheduled to be in-flight during the entirety of the second time segment.

* * * * *